(12) United States Patent
Schreier et al.

(10) Patent No.: US 11,590,814 B2
(45) Date of Patent: Feb. 28, 2023

(54) SAFETY CONNECTOR FOR TRAILERS

(71) Applicants: Ryan B. Schreier, Plymouth, MN (US); Charles B. Reinken, Shakopee, MN (US)

(72) Inventors: Ryan B. Schreier, Plymouth, MN (US); Charles B. Reinken, Shakopee, MN (US)

( * ) Notice: Subject to any disclaimer, the term of this patent is extended or adjusted under 35 U.S.C. 154(b) by 88 days.

(21) Appl. No.: 17/146,061

(22) Filed: Jan. 11, 2021

(65) Prior Publication Data

US 2021/0252927 A1 Aug. 19, 2021

Related U.S. Application Data

(60) Provisional application No. 62/958,976, filed on Jan. 9, 2020.

(51) Int. Cl.
*B60D 1/28* (2006.01)
*B60D 1/06* (2006.01)

(52) U.S. Cl.
CPC ...... *B60D 1/28* (2013.01); *B60D 1/06* (2013.01)

(58) Field of Classification Search
CPC ........................................................ B60D 1/28
See application file for complete search history.

(56) References Cited

U.S. PATENT DOCUMENTS

| | | | | |
|---|---|---|---|---|
| 3,479,057 A * | 11/1969 | Miller | ............... | B60D 1/065 340/687 |
| 3,522,958 A * | 8/1970 | Lusignan | ............. | B60D 1/28 280/507 |
| 3,549,173 A * | 12/1970 | Stanfield | ................. | B60D 1/28 280/511 |
| 4,208,065 A * | 6/1980 | Hansen | ................. | B60D 1/60 280/507 |
| 4,291,893 A * | 9/1981 | Hansen | ................. | B60D 1/28 280/507 |
| 4,459,832 A * | 7/1984 | Avrea | ................. | B60D 1/60 280/507 |
| 5,087,064 A * | 2/1992 | Guhlin | ................. | B60D 1/28 280/507 |
| 6,969,085 B2 * | 11/2005 | Causey, Jr. | ............ | B60D 1/363 280/507 |
| 8,313,119 B2 | 11/2012 | Frantz | | |
| 2006/0186639 A1 * | 8/2006 | Rosario | ................. | B60D 1/58 280/507 |
| 2012/0032416 A1 | 2/2012 | Frantz | | |
| 2014/0167391 A1 | 6/2014 | Elliott et al. | | |
| 2015/0123379 A1 | 5/2015 | Yuan | | |
| 2019/0143770 A1 * | 5/2019 | Sartin | ................. | B60D 1/025 280/507 |

FOREIGN PATENT DOCUMENTS

| | | | | |
|---|---|---|---|---|
| CA | 2216002 A1 * | 4/1999 | ............ | B60D 1/06 |
| FR | 2570991 A1 * | 4/1986 | | |

* cited by examiner

*Primary Examiner* — Kevin Hurley
(74) *Attorney, Agent, or Firm* — Pauly, DeVries Smith & Definer LLC

(57) ABSTRACT

A trailer retainer assembly having a riser section extending above a ball mount area and a retainer member arranged to move along the riser section from an upper position to a lower position; wherein when the retainer member is placed in a lower position it at least partially covers the ball mount area such that a trailer coupler secured to the ball mount area is retained by the retainer member.

1 Claim, 12 Drawing Sheets

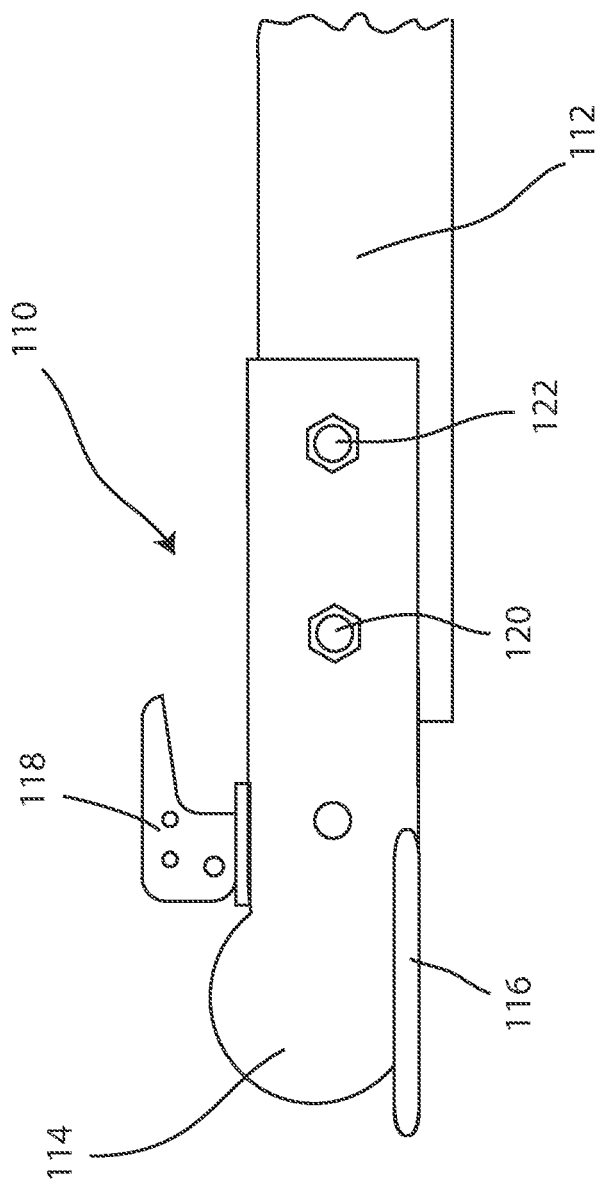
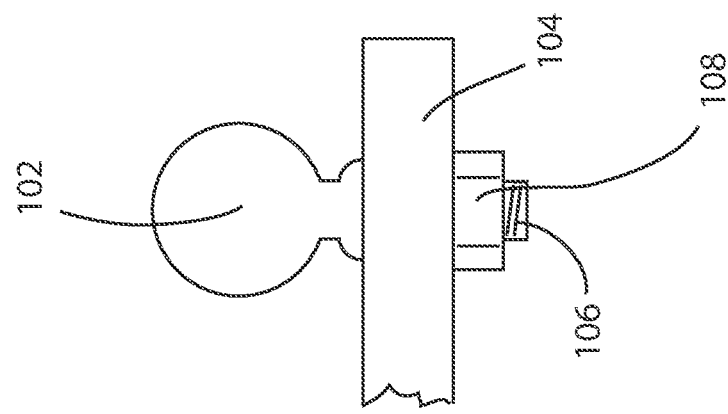

SAFETY CONNECTOR FOR TRAILERS

This application claims the benefit of U.S. Provisional Application No. 62/958,976, filed Jan. 9, 2020, the content of which is herein incorporated by reference in its entirety.

FIELD OF THE INVENTION

The present disclosure is directed to safety connectors for trailers, in particular safety connectors to prevent a trailer from disengaging from a ball-type hitch.

BACKGROUND

Ball-type hitch assemblies are commonly used to connect a trailer to a vehicle. Such hitch assemblies us a metal ball-shaped hitch on the vehicle ("the ball"), combined with a corresponding recessed receptor on tongue of the trailer. The ball is received by the receptor on the trailer and locked into place, typically by a clamping force from a lever mechanism inside the receptor on the trailer tongue. This lever mechanism is engaged by moving a handle on the outside of the receptor between an open "up" position and a closed "down" position. The lever mechanism can also typically be locked in place through a hole at its base, allowing a pin to be inserted to prevent unlocking of the trailer, or even a padlock to provide a degree of prevention of theft by stopping unauthorized opening of the receptor.

Although ball-type hitch assemblies have been in use for many years and are quite useful and successful, they suffer from the problem of potential decoupling of the trailer if the ball and receptor do not have a proper connection. For example, during travel sometimes the lever mechanism can inadvertently work its way loose, especially if no pin is inserted in the locking hole or if the pin works its way loose. Similarly, sometimes the lever mechanism is inadvertently left open, causing the ball and receptor to only loosely connect and risking disconnection during use, such as when a bump is run over on a road. Also, this problem can occur, for example, when the ball is undersized relative to the receptor. The balls and receptors come in various sizes, and sometimes a hitch receptor that is too large for the ball is improperly used. For example, a 1 and ¾ inch ball may be improperly used with a 2 inch receptor. Such situations can lead to the hitch assembly not making proper connections, and the trailer disengaging.

Thus, a need exists for an improved hitch assembly, especially one that prevents a trailer from disconnecting when the primary ball-receptor connection fails.

SUMMARY OF THE INVENTION

The present disclosure is directed to a trailer retainer assembly having a riser section extending above a ball mount area and a retainer member arranged to move along the riser section from an upper position to a lower position; wherein when the retainer member is placed in a lower position it at least partially covers the ball mount area such that a trailer coupler secured to the ball mount area is retained by the retainer member.

The above summary of the present invention is not intended to describe each discussed embodiment of the present invention. This is the purpose of the figures and the detailed description that follows.

FIGURES

The invention may be more completely understood in connection with the following drawings, in which:

FIGS. 1 and 2 show a standard ball-style hitch components before connecting in accordance with a first construction.

Figure 3:
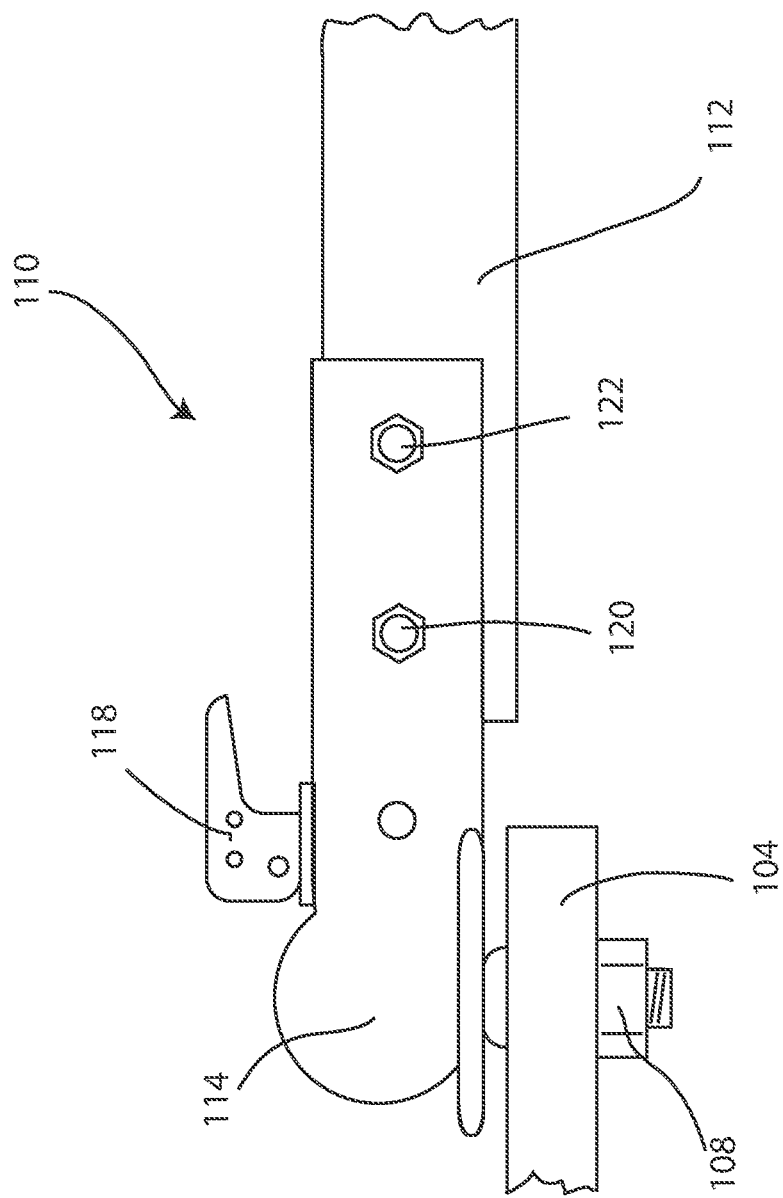
FIG. 3 shows standard ball-style hitch components after connecting to a trailer in accordance with a first construction.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

Now, in reference to the drawings, FIGS. 1 and 2 show standard ball-style hitch components before connecting to a vehicle. The hitch components include a ball 102 joined to a hitch extension 104 on a vehicle (not shown). The ball is secured, in the embodiment shown, to the hitch extension 104 by way of a bolt 106 extending from the bottom of the ball, and a nut 108 on the bolt 106. Thus, the ball 102 is well secured to the vehicle. The hitch 110 includes a tongue 112 having a ball-receiver 114 with an open bottom area 116, along with a latch mechanism 118. In the embodiment shown the hitch 110 includes two nuts 120 and bolts 122 that secure the hitch 110 to the tongue 112, although it will be understood that the hitch 110 can also be welded or otherwise connected to the tongue 112.

FIG. 3 shows standard ball-style hitch components after connecting, with the ball now within the end the ball-receiver 114. The latch mechanism 18 is shown in a down or closed position, with the interior of the hitch 110 engaging the ball to hold it securely (the latch mechanism is lifted up by rotating it 90 degrees to open the space in the ball-receiver 114 during installation and removal of the ball 102 from the ball-receiver when connecting and disconnecting the trailer from a vehicle). As noted above, problems can arise when the ball 102 is not securely held within the ball-receiver 114, such as when the latch mechanism 118 is left in an open or "up" position.

Figure 4:
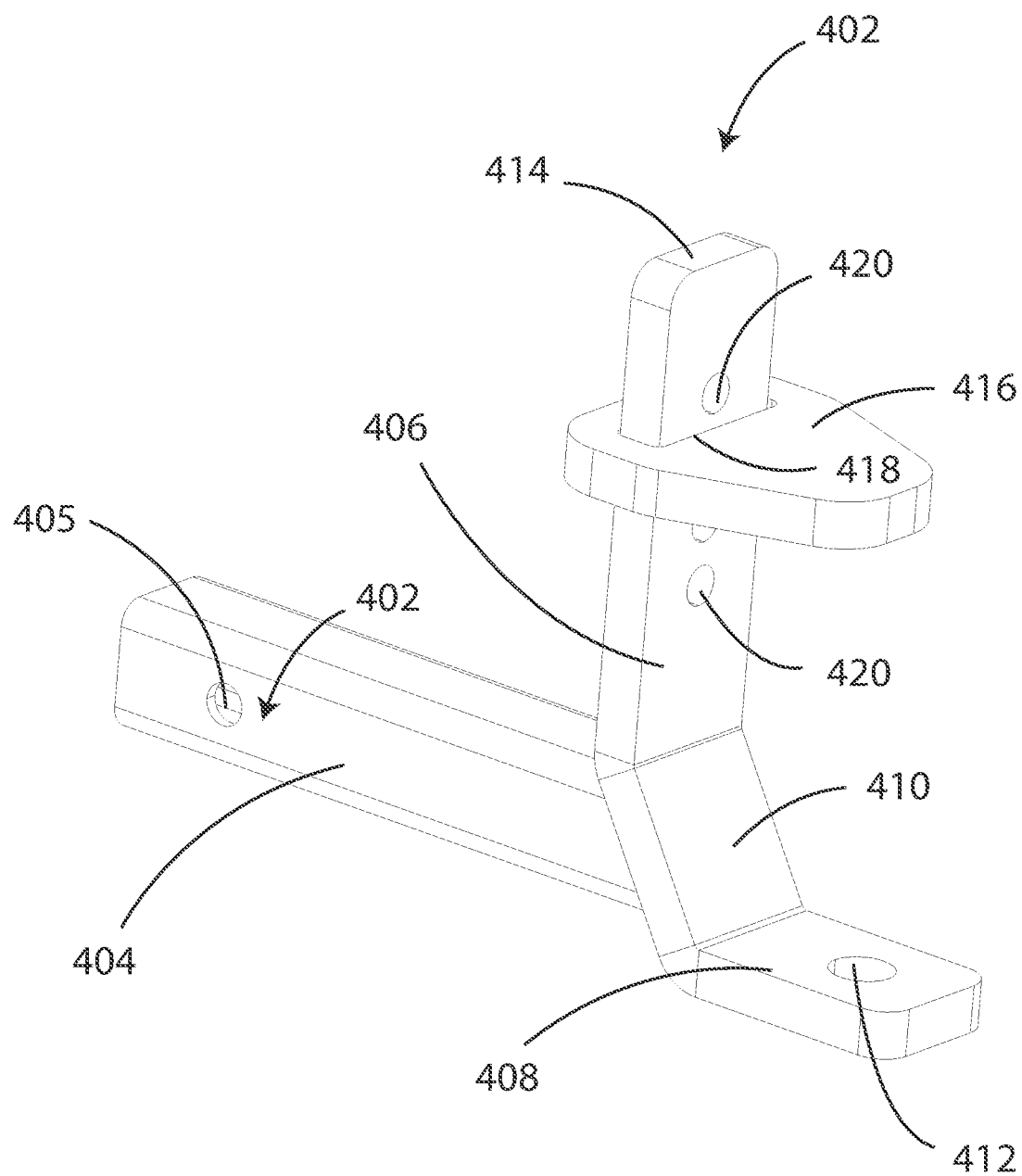
FIG. 4 is a perspective view of a trailer retainer assembly made in accordance with the present disclosure.

FIG. 4 is a perspective view of a trailer retainer assembly 402 made in accordance with the present disclosure. The trailer retainer assembly 402 includes an insert bar 404 that is mounted within the receiver of a vehicle (not shown). The insert bar 404 typically includes a locking hole 405 into which a bolt or pin is placed to retain the insert bar 404 within the receiver to securely hold the trailer retainer assembly 402 to a vehicle. The trailer retainer assembly 402 further includes a riser section 406 extending above the insert bar 404; as well as a base 408 into which a hole 412 is formed to receive a ball assembly (not shown). In the depicted embodiment the riser section 406 and base 408 are joined to one another by an intermediate portion 410. This intermediate portion 410 is optional in most constructions, and thus instead the riser section 406 can directly connect into the base 408. It will be appreciated that in some constructions the riser section 406, the base 408, and the intermediate portion 410 can be constructed out of a single piece of metal (typically steel) that is bent into shape. Thus these portions can have the configuration shown in FIG. 4, or can have a different configuration (such as a curved form as opposed to the form with bent angles). Also, it will be understood that in some implementations the ball is integrally formed to the base 408, such as being permanently welded to the base 408 (in which case no hole 412 will be present.

The riser section 406 includes a retainer member 416 having a hole 418 that fits over the riser section 406 and can slide upward and downward. The retainer member 416 can be locked into place by placing a pin through one of multiple openings 420. By placing a pin (not shown) in a hole 418 above the retainer member 416, it is possible to prevent a trailer coupling from coming off a trailer (as will be described below). In addition, the riser section 406 includes a top end 414, this top end is generally open to allow placement of the retainer member 416 onto the riser section 406, although in some implementations a cap or lock is placed at the top end 414 to prevent it from coming off and getting lost.

Figure 5:
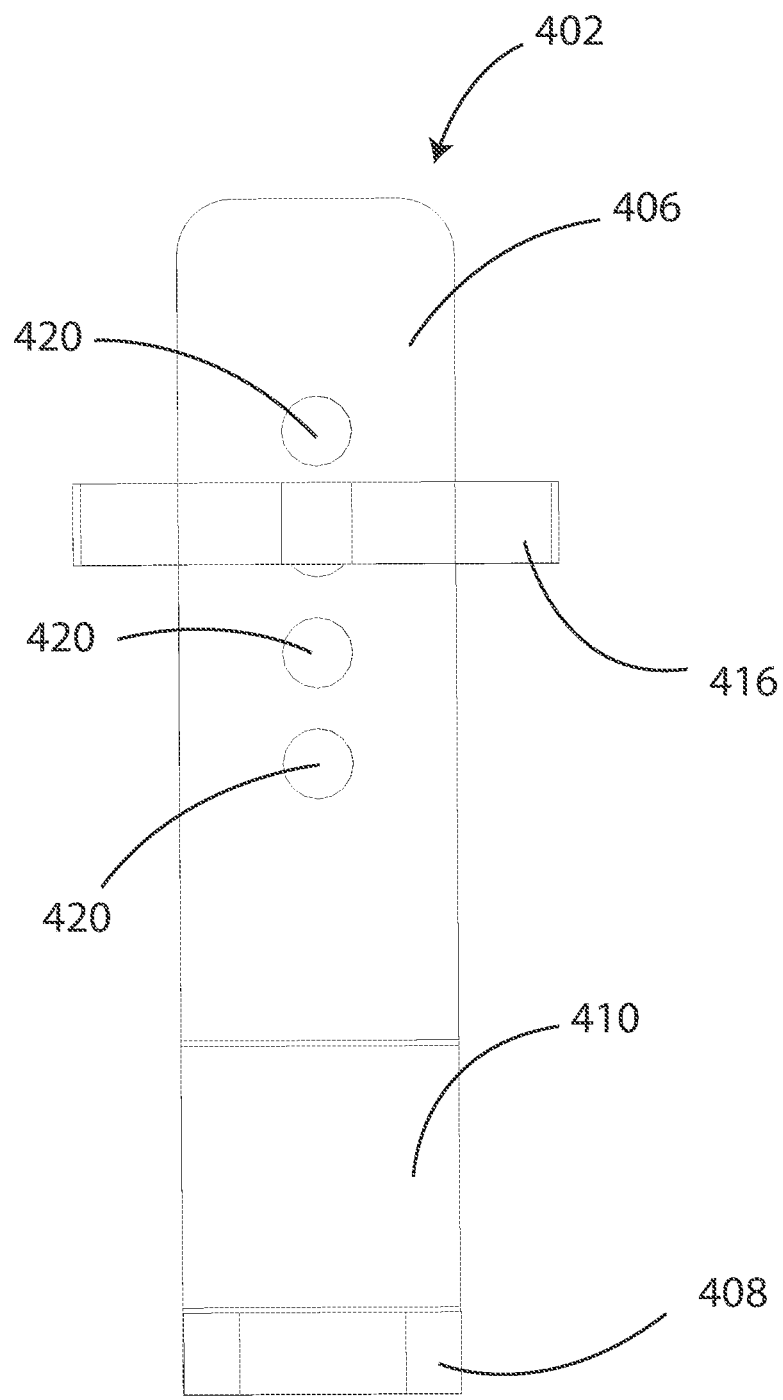
FIG. 5 is a front elevation view of the trailer retainer assembly of FIG. 4.

FIG. 5 is a front elevation view of the trailer retainer assembly 402 of FIG. 4, showing the riser section 406 onto which is mounted the retainer member 416. Multiple openings 420 are shown for placement of a locking pin to hold the retainer member 416 in place. Also shown is the base 408 and intermediate portion 410.

Figure 6:
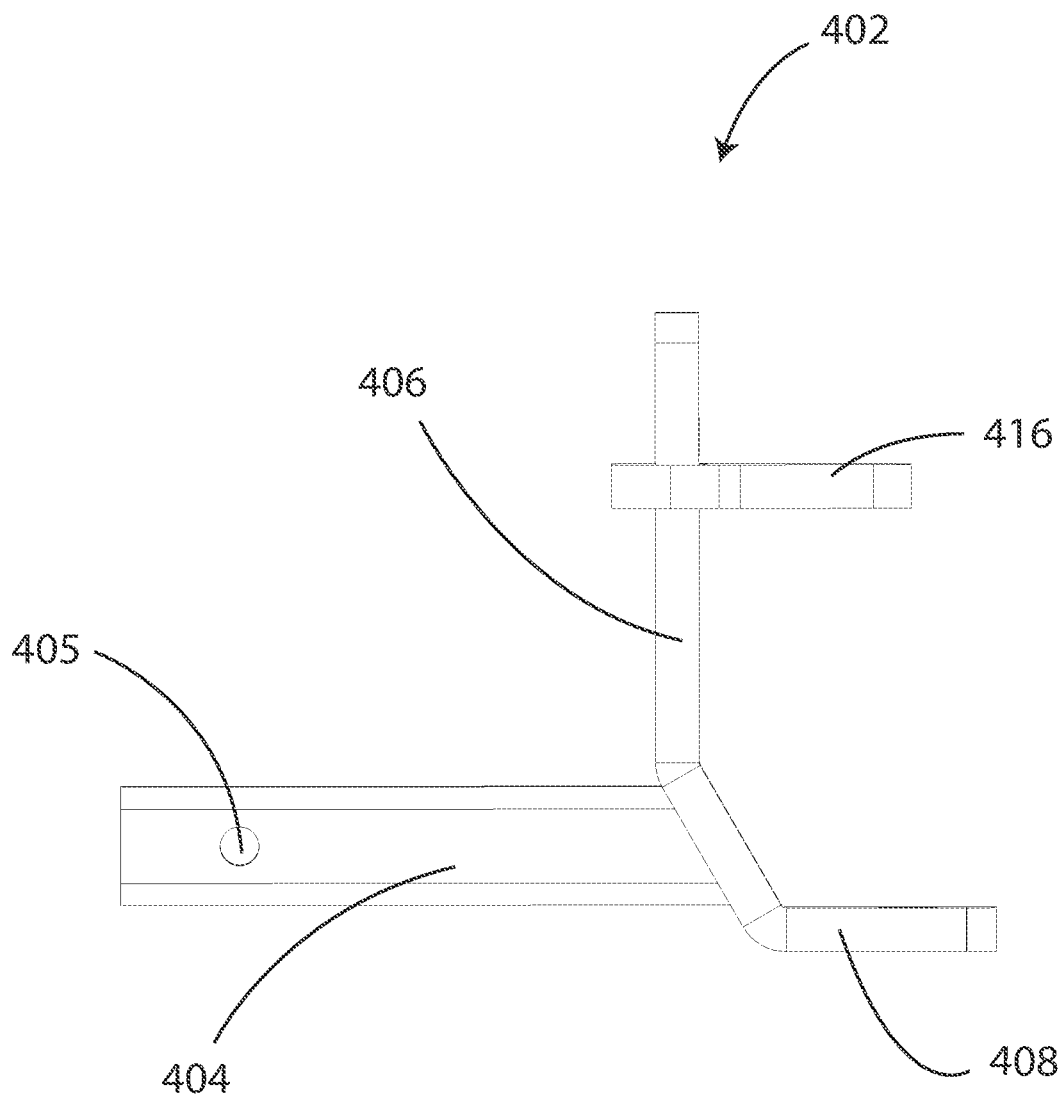
FIG. 6 is a side elevational view of a trailer hitch retainer made in accordance with the present disclosure, showing the locking member in an upright position without a ball installed.
Figure 7:
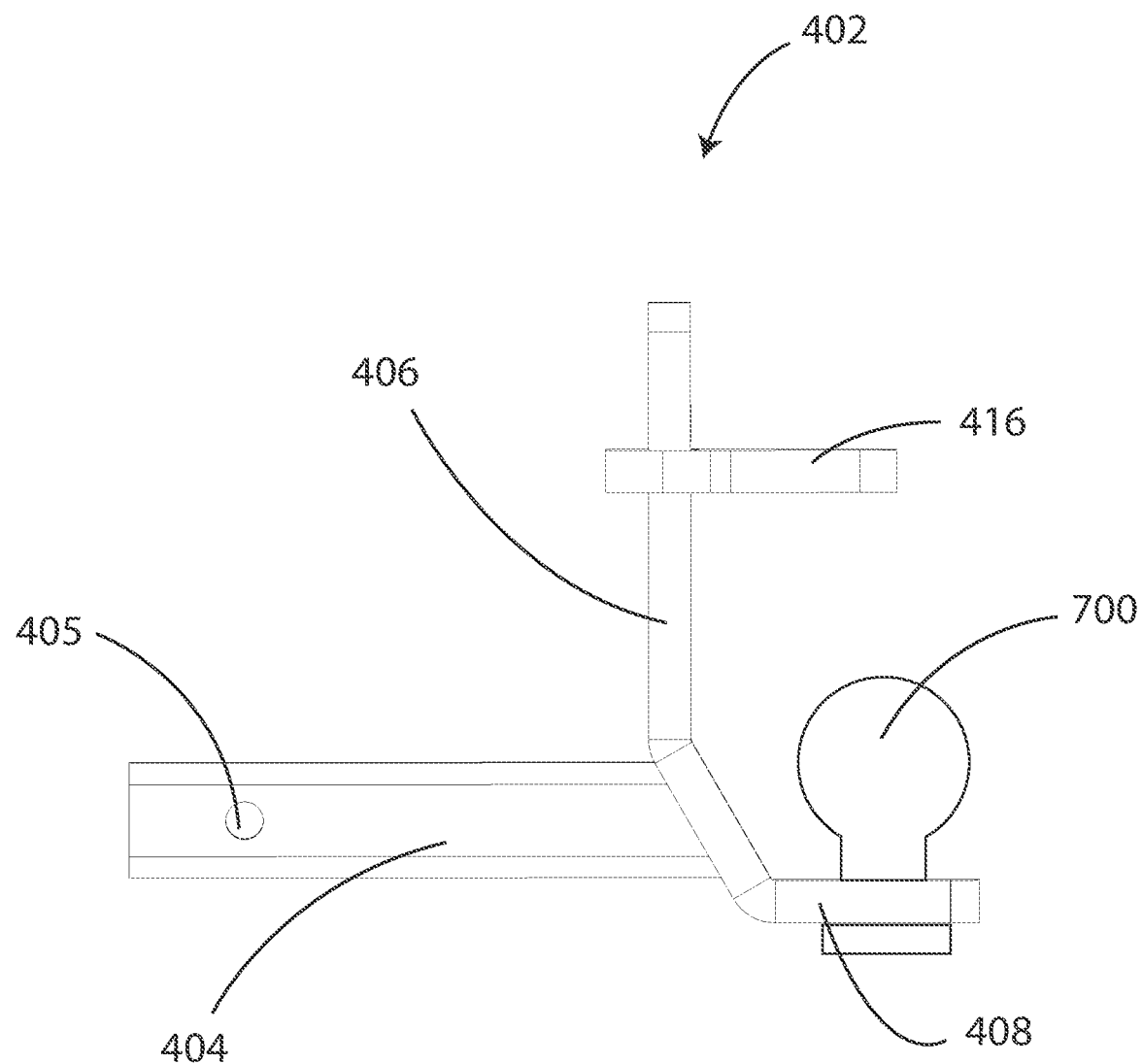
FIG. 7 is a side elevational view of a trailer retainer made in accordance with the present disclosure, showing the locking member in an upright position with a ball installed.

FIG. 6 is a side elevational view of a trailer retainer assembly 402 made in accordance with the present disclosure, showing the retainer member 416 in an upright position without a ball installed. The retainer member 416 is positioned on the riser section 406. The insert bar 404, base 408, and other components are also shown. FIG. 7 is a side elevational view of a trailer hitch retainer made in accordance with the present disclosure, showing the retainer member 416 in an upright position on the riser section 406 with a ball 700 installed.

Figure 8:
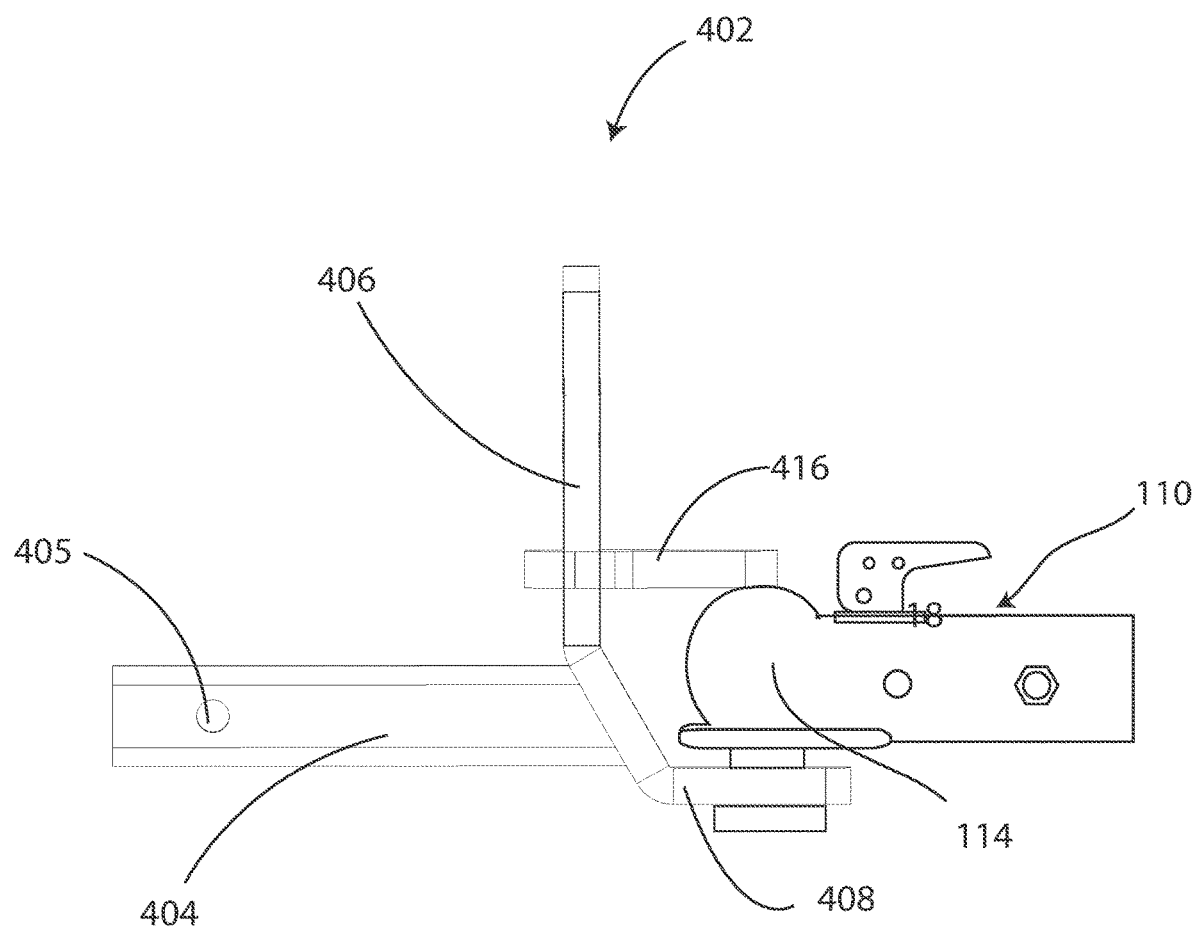
FIG. 8 is a side elevational view of a trailer retainer made in accordance with the present disclosure, showing the locking member in a lowered position on top of a trailer coupler.

FIG. 8 is a side elevational view of a trailer hitch retainer made in accordance with the present disclosure, showing the retainer member 416 in a lowered position on top of a trailer coupler 114 and preventing the retainer coupler from coming off of the ball. This configuration, in which the retainer member 416 is positioned above trailer coupler 114 and in contact with the trailer coupler 114 or near-contact with the trailer coupler 114 prevents the trailer coupler from lifting off of the ball, while still allowing the trailer coupler 114 to rotate and pivot on the ball. Thus, the retainer member 416 secures the trailer coupler 114 in place while still allowing normal freedom of movement, such as moving around corners and taking turns, going up and down hills, etc. Generally, a pin or other locking device (such as a padlock in some embodiments is secured through one of the openings 420 to prevent the retaining member 416 from moving upward and off the ball. This prevents the trailer from either coming off of the ball. Note as well that the present design can be used to prevent theft of a trailer by locking the retainer member 416 in place. Notably, even removal of the ball by removing a nut securing the ball in place will not allow the trailer to be removed—in this regard some of the key aspects of the present design are shown because even if the ball is not secured the trailer can still be held in place, which avoids both accidental release of the trailer and intentional, but unauthorized, release of the trailer.

The retainer member 416 can be held in place by friction when upward force is applied to the bottom of it by the trailer coupler. Thus, while a pin can be used to prevent the retainer member 416 from moving upward on the riser section 406 and keeping it in a correct position, the retainer member 416 does not come into contact with the retention pin, rather the friction and leverage caused by upward force/pressure can cause the retainer member 416 to remain in place and hold the coupler on top of the hitch ball.

Figure 9:
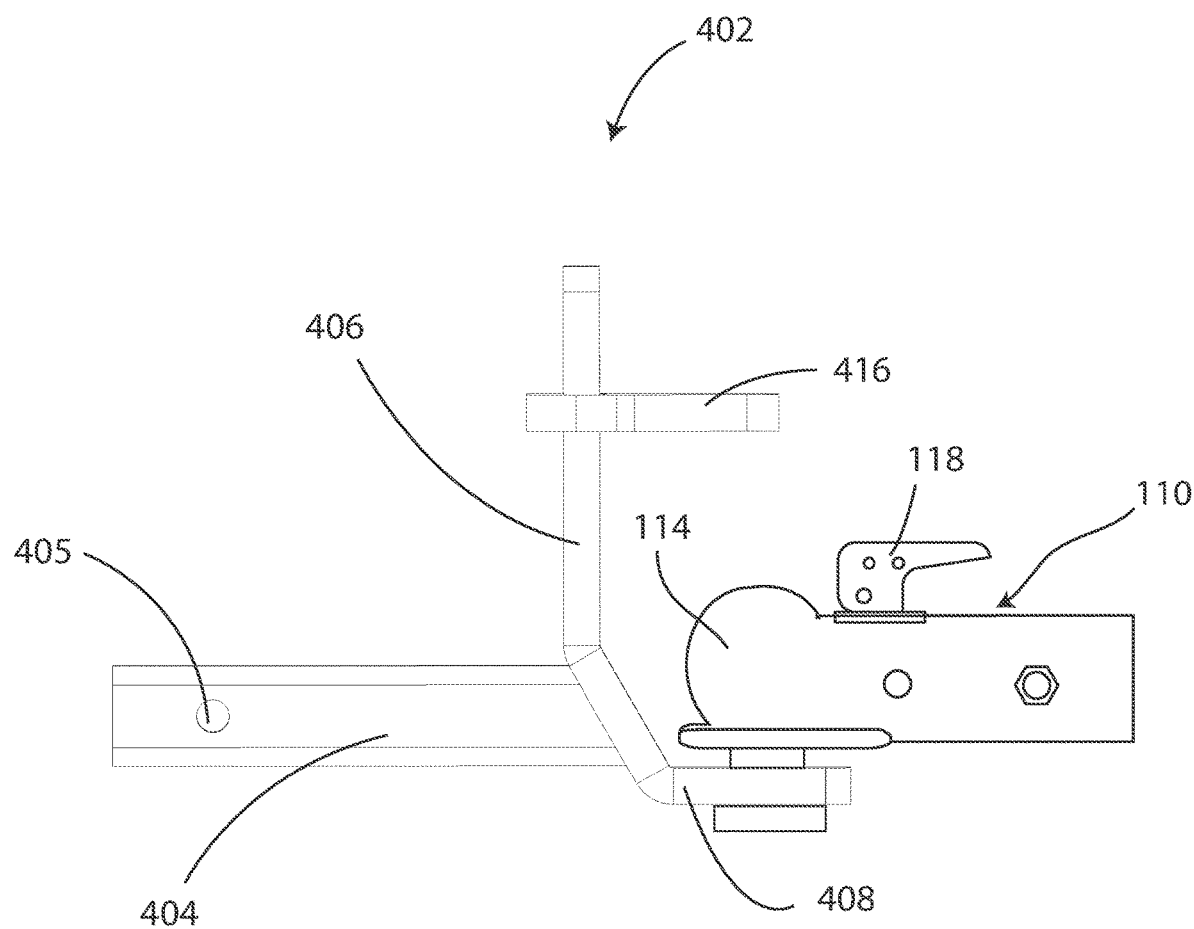
FIG. 9 is a side elevational view of a trailer retainer made in accordance with the present disclosure, showing the locking member in a raised position on top of a trailer coupler.

FIG. 9 is a side elevational view of a trailer hitch retainer 402 made in accordance with the present disclosure, showing the retainer member 416 in a raised position above trailer coupler 114. In this mode of operation it is possible to easily remove the trailer coupler 114 by lifting the coupler 114 off the ball, without obstruction from the retaining member 114.

Figure 10:
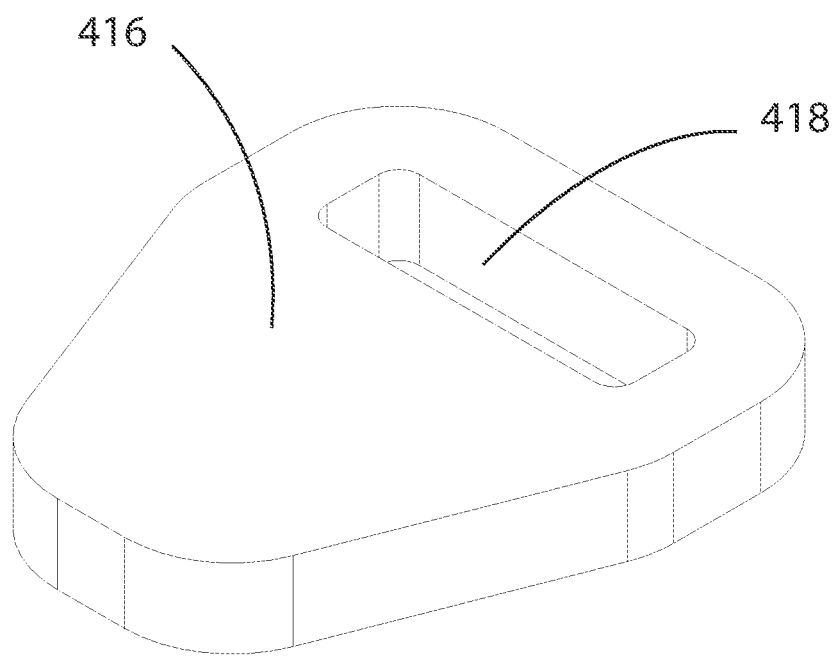
FIG. 10 is a perspective view of a retainer member.
Figure 11:
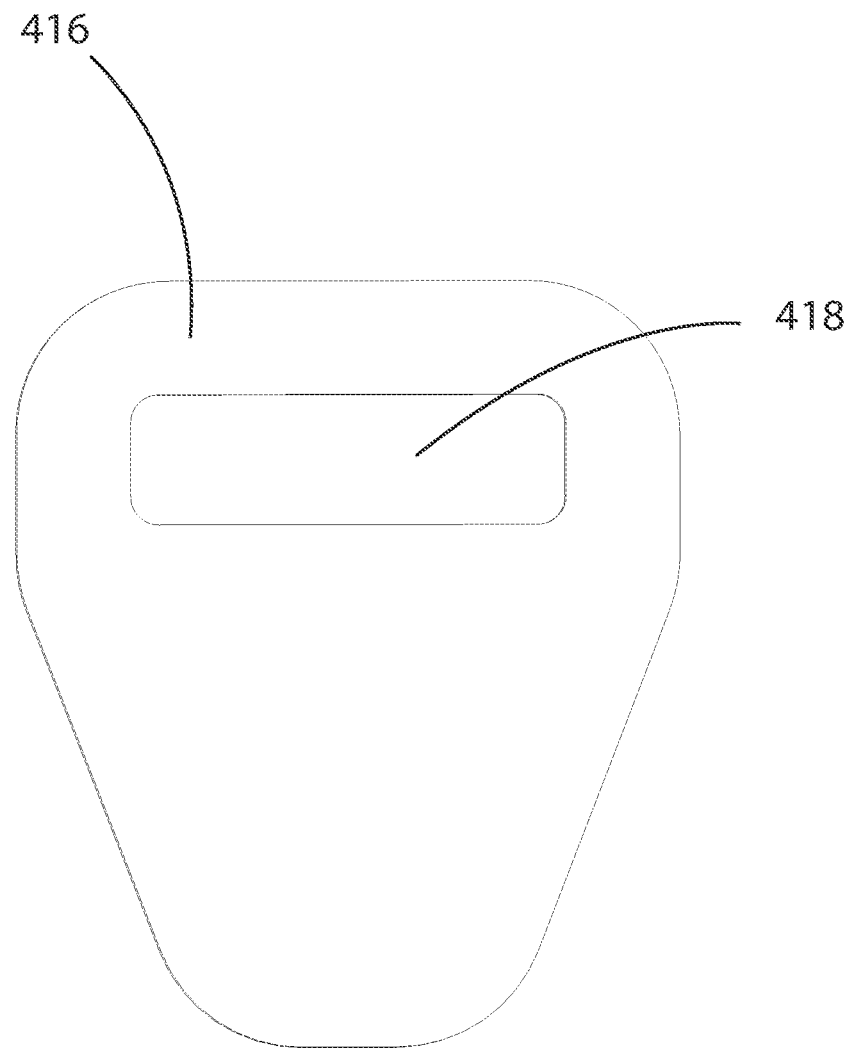
FIG. 11 is a top elevational view of a retainer member.
Figure 12:
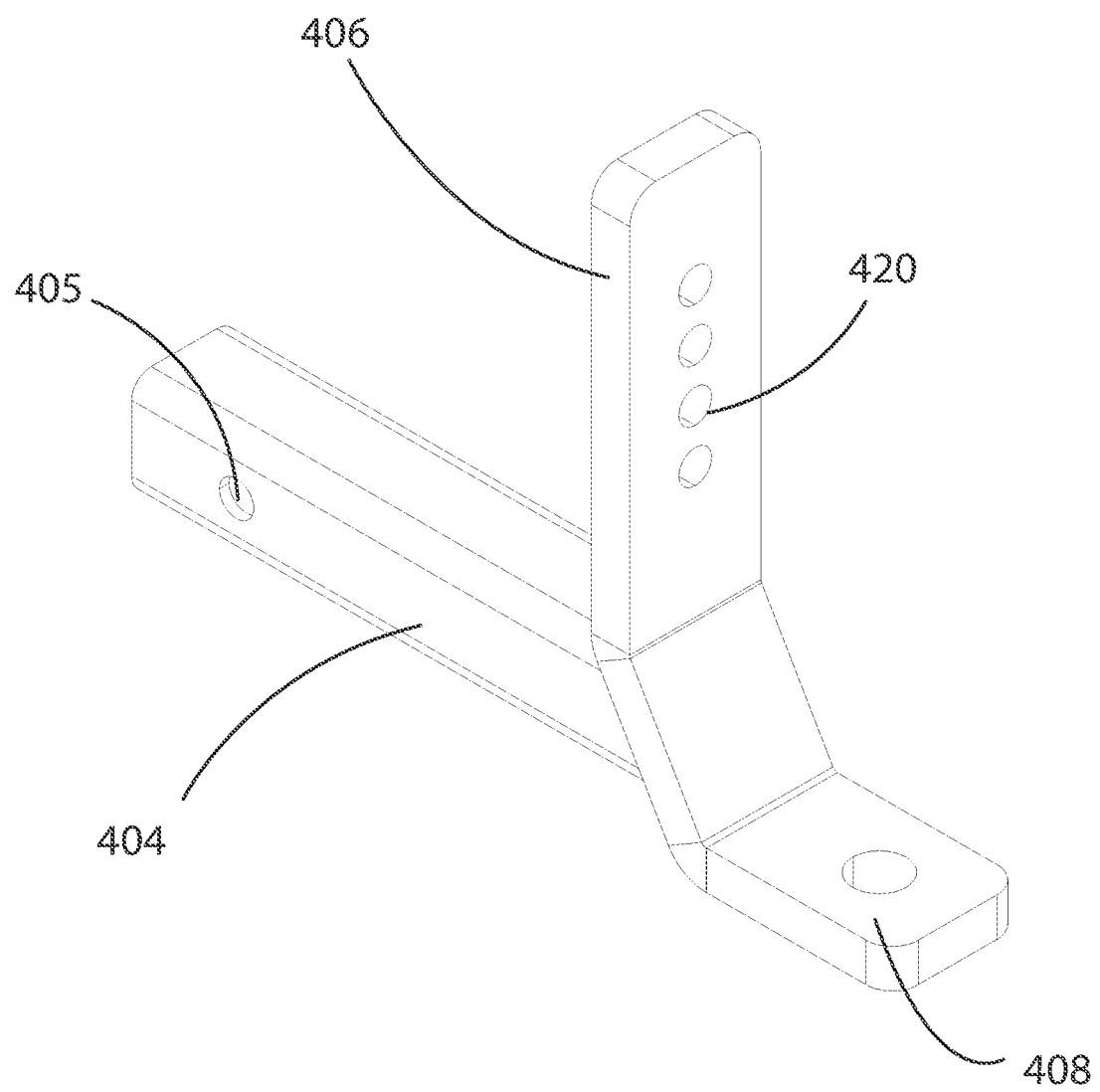
FIG. 12 is a perspective view of a trailer retainer assembly 402 without the retainer member installed.
Figure 13:
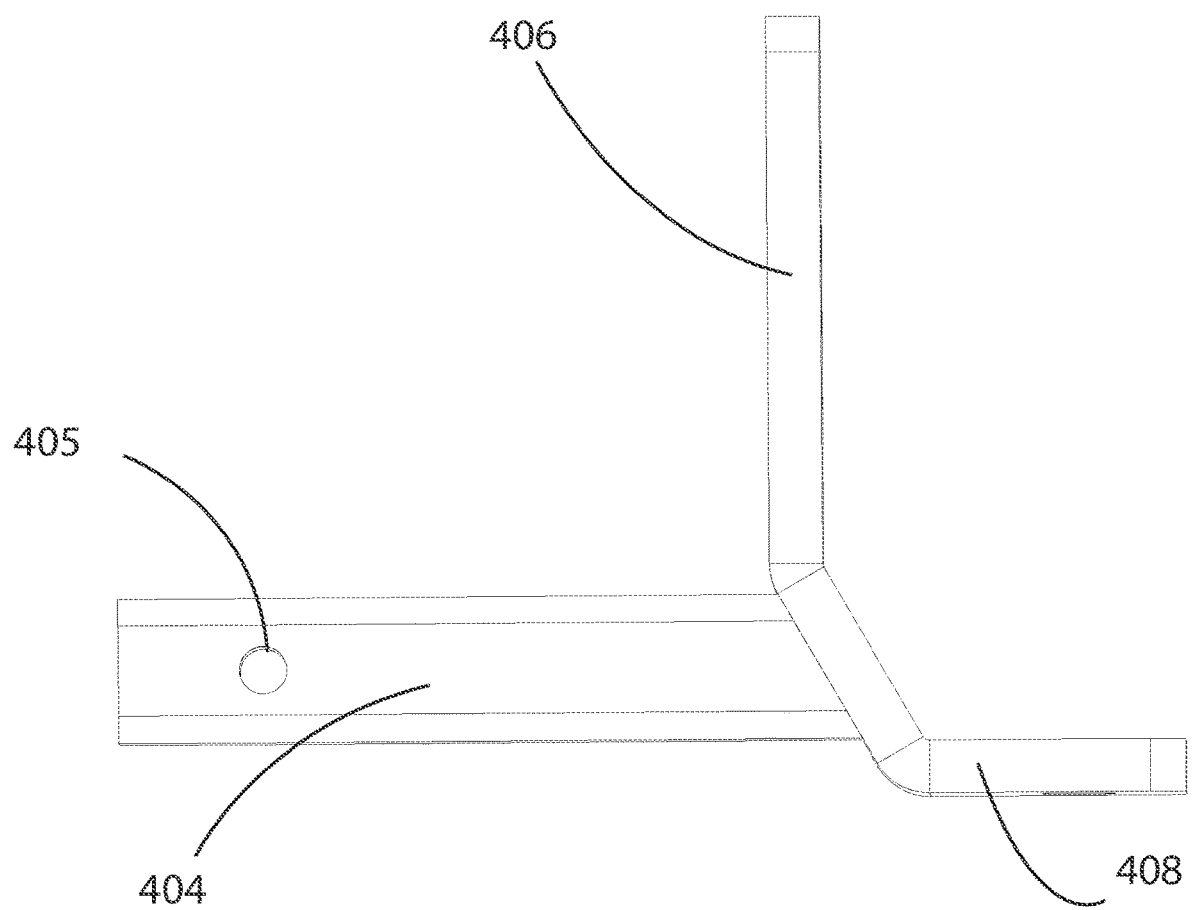
FIG. 13 is a perspective view of a trailer retainer assembly 402 without the retainer member installed.

FIG. 10 is a perspective view of a retainer member 416, showing the hole 418. FIG. 11 is a top elevational view of a retainer member 416 showing the hole 418. FIG. 12 is a perspective view of a trailer retainer assembly 402 without the retainer member 416 installed. FIG. 13 is a perspective view of a trailer retainer assembly 402 without the retainer member installed.

While the present invention has been described with reference to several particular implementations, those skilled in the art will recognize that many changes may be made hereto without departing from the spirit and scope of the present invention.

We claim:

1. A trailer retainer assembly, the trailer retainer assembly comprising:
   a) a riser section extending above a ball mount area; the riser section having an open tip;
   b) a retainer member arranged to move along the riser section from an upper position to a lower position; the retainer member comprising a hole that fits over the riser section such that the retainer member can slide upward and downward on the riser section;
   wherein when the retainer member is placed in a lower position it at least partially covers the ball mount area such that a trailer coupler secured to the ball mount area is retained by the retainer member;
   wherein the retainer member is held in place by friction when an upward force is applied to the bottom of the retainer member by the trailer coupler.

* * * * *